(12) United States Patent
Walton et al.

(10) Patent No.: US 6,389,494 B1
(45) Date of Patent: May 14, 2002

(54) SYSTEM FOR INTERFACING A DATA STORAGE SYSTEM TO A HOST UTILIZING A PLURALITY OF BUSSES FOR CARRYING END-USER DATA AND A SEPARATE BUS FOR CARRYING INTERFACE STATE DATA

(75) Inventors: John K. Walton, Mendon; Daniel Castel, Framingham; Kendell Alan Chilton, Marlborough, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/223,519

(22) Filed: Dec. 30, 1998

(51) Int. Cl.[7] ................................................ G06F 13/14
(52) U.S. Cl. ....................... 710/126; 710/56; 711/105; 711/112; 711/114
(58) Field of Search ........................... 710/129, 56, 126; 711/105, 112, 119

(56) References Cited

U.S. PATENT DOCUMENTS

| | | | |
|---|---|---|---|
| 4,780,808 A | * 10/1988 | Moreno et al. | |
| 5,206,939 A | 4/1993 | Yanai et al. | 395/400 |
| 5,586,264 A | * 12/1996 | Belknap et al. | 709/219 |
| 5,603,058 A | * 2/1997 | Belknap et al. | 710/35 |
| 5,742,789 A | * 4/1998 | Ofer et al. | 711/111 |
| 5,787,265 A | 7/1998 | Leshem | 395/306 |
| 5,799,209 A | * 8/1998 | Chatter | 710/56 |
| 5,805,821 A | * 9/1998 | Saxena et al. | 709/231 |
| 5,819,054 A | 10/1998 | Ninomiya et al. | 395/309 |
| 5,819,104 A | * 10/1998 | Tuccio | 710/2 |
| 5,948,062 A | * 9/1999 | Tzelnic et al. | 709/219 |
| 6,055,603 A | * 4/2000 | Ofer et al. | 711/113 |

FOREIGN PATENT DOCUMENTS

| | | | |
|---|---|---|---|
| EP | 0 510 821 A1 | 10/1992 | G06F/12/08 |
| EP | 0 795 812 A1 | 9/1997 | G06F/3/06 |

* cited by examiner

*Primary Examiner*—Thomas Lee
*Assistant Examiner*—Abdelmoniem Elamin
(74) *Attorney, Agent, or Firm*—Daly, Crowley & Mofford, LLP

(57) ABSTRACT

A data storage system wherein end-user data is transferred between a host computer and a bank of disk drives through an interface. The interface includes a memory and a plurality of directors interconnected through an interface state data bus and a plurality of end-user data busses. At least one front-end one of the directors is in communication with the host computer and at least one rear-end one of the directors is in communication with the bank of disk drives. The interface state data bus section is in communication with: both the at least one front-end one and the at least one rear-end one of the directors; and to the memory. Each one of the plurality of end-user data buses has a first end coupled to a corresponding one of the plurality of directors and a second end coupled to the memory. The plurality of directors control the end-user data transfer between the host computer and the bank of disk drives through the memory in response to interface state data generated by the directors as such end-user data passes through the end-user data busses. The generated interface state data is transferred among the directors through the memory as such end-user data passes through the end-user bus.

37 Claims, 8 Drawing Sheets

SYSTEM FOR INTERFACING A DATA STORAGE SYSTEM TO A HOST UTILIZING A PLURALITY OF BUSSES FOR CARRYING END-USER DATA AND A SEPARATE BUS FOR CARRYING INTERFACE STATE DATA

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host computer systems require large capacity data storage systems. These large computer systems generally include data processors which perform many operations on data introduced to the computer system through peripherals including the data storage system. The results of these operations are output to peripherals, including the storage system.

One type of data storage system is a magnetic disk storage system. Here a bank of disk drives and the computer system are coupled together through an interface. The interface includes CPU, or "front end", directors (or controllers) and "back end" disk directors (or controllers). The interface operates the directors in such a way that they are transparent to the computer. That is, data is stored in, and retrieved from, the bank of disk drives in such a way that the computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU directors and disk directors, addressable cache memories. The cache memory is a semiconductor memory and is provided to rapidly store data from the computer system before storage in the disk drives, and, on the other hand, store data from the disk drives prior to being sent to the computer. The cache memory being a semiconductor memory, as distinguished from a magnetic memory as in the case of the disk drives, is much faster than the disk drives in reading and writing data.

The CPU directors, disk directors and cache memory are interconnected through a backplane printed circuit board. More particularly, disk directors are mounted on disk director printed circuit boards. CPU directors are mounted on CPU director printed circuit boards. And, cache memories are mounted on cache memory printed circuit boards. The disk director, CPU director and cache memory printed circuit boards plug into the backplane printed circuit board. In order to provide data integrity in case of a failure in a director, the backplane printed circuit board has a pair of buses. One set of the disk directors is connected to one bus and another set of the disk directors is connected to the other bus. Likewise, one set the CPU directors is connected to one bus and another set of the CPU directors is connected to the other bus. The cache memories are connected to both buses. Each one of the buses provides data, address and control information. Thus, the use of two buses provides a degree of redundancy to protect against a total system failure in the event that the directors, or disk drives connected to one bus fail and also increases the bandwidth of the system compared with a system which uses a single bus. One such dual bus system is shown in FIG. 1.

In operation, when the host computer wishes to store end-user (i.e., host computer) data at an address, the host computer issues a write request to one of the front-end directors to perform a write command. One of the front-end directors replies to the request and asks the host computer for the data. After the request has passed to the requesting one of the front-end directors, the director determines the size of the end-user data and reserves space in the cache memory to store the request. The front-end director then produces control signals on either one of the busses connected to such front-end director. The host computer then transfers the data to the front-end director. The front-end director then advises the host computer that the transfer is complete. The front-end director looks up in a Table, not shown, stored in the cache memory to determine which one of the rear-end directors is to handle this request. The Table maps the host computer address into an address in the bank of disk drives. The front-end director then puts a notification in a "mail box" (not shown and stored in the cache memory) for the rear-end director which is to handle the request, the amount of the data and the disk address for the data. Other rear-end directors poll the cache memory when they are idle to check their "mail boxes". If the polled "mail box" indicates a transfer is to be made, the rear-end director processes the request, addresses the disk drive in the bank, reads the data from the cache memory and writes it into the addresses of a disk drive in the bank. When end-user data previously stored in the bank of disk drives is to be read from the disk drive and returned to the host computer, the interface system operates in a reciprocal manner. The internal operation of the interface, (e.g. "mail-box polling", event flags, data structures, device tables, queues, etc.) is controlled by interface state data which passes between the directors through the cache memory. Further, end-user data is transferred through the interface as a series of multi-word transfers, or bursts. Each word transfer in a multi-word transfer is here, for example, 64 bits. Here, an end-user data transfer is made up of, for example, 32 bursts. Each interface state word is a single word having, for example, 64 bits.

It is first noted that the end-user data and interface state data are transferred among the directors and the cache memory on the busses. The transfer of each word, whether a burst of end-user data or an interface state data passes through the interface in the same manner; i.e., requiring a fixed amount of overhead, i.e., bus arbitration, etc. Each one of the two busses must share its bandwidth with both end-user data and the interface state data. Therefore, the bandwidth of the system may not be totally allocated to end-user data transfer between the host computer and the bank of disk drives.

SUMMARY OF THE INVENTION

In accordance with the present invention, a data storage system is provided wherein end-user data is transferred between a host computer and a bank of disk drives through an interface. The interface includes a memory and a plurality of directors interconnected through an interface state data bus and a plurality of end-user data busses. At least one front-end one of the directors is in communication with the host computer and at least one rear-end one of the directors is in communication with the bank of disk drives. The interface state data bus section is in communication with: both the at least one front-end one and the at least one rear-end one of the directors; and to the memory. Each one of the plurality of end-user data buses has a first end coupled to a corresponding one of the plurality of directors and a second end coupled to the memory. The plurality of directors control the end-user data transfer between the host computer and the bank of disk drives through the memory in response to interface state data generated by the directors as such end-user data passes through the end-user data busses. The generated interface state data is transferred among the directors through the memory as such end-user data passes through the end-user bus.

With such an arrangement, the system bandwidth is increased because end-user data and interface state data are carried on separate bus systems within the interface.

BRIEF DESCRIPTION OF THE DRAWING

For a more complete understanding of the invention, reference is now made to the following description taken together in conjunction with the accompanying drawing, in which.

DETAILED DESCRIPTION

Figure 1:
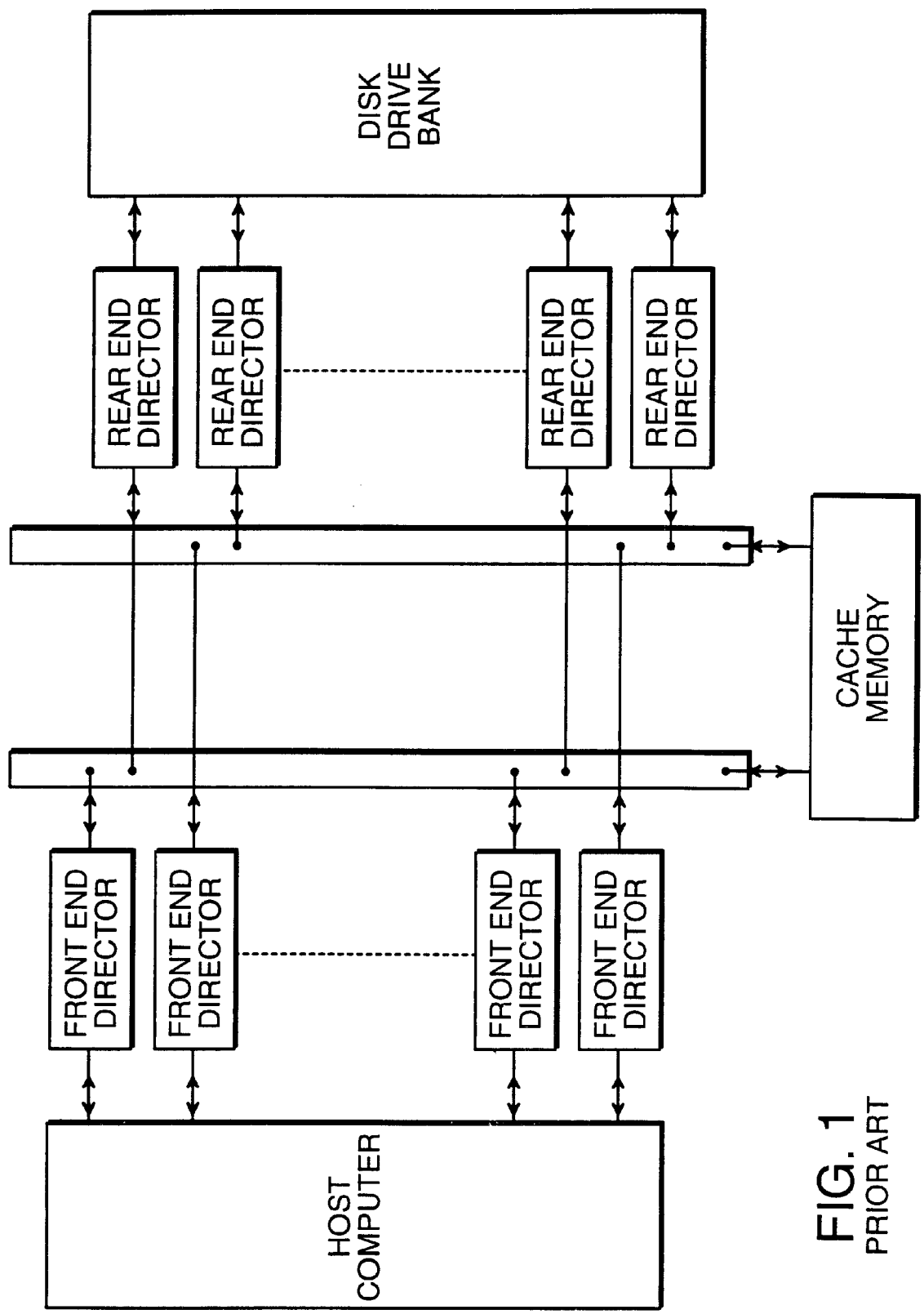
FIG. 1 is a block diagram of a memory system according to the PRIOR ART.
Figure 2:
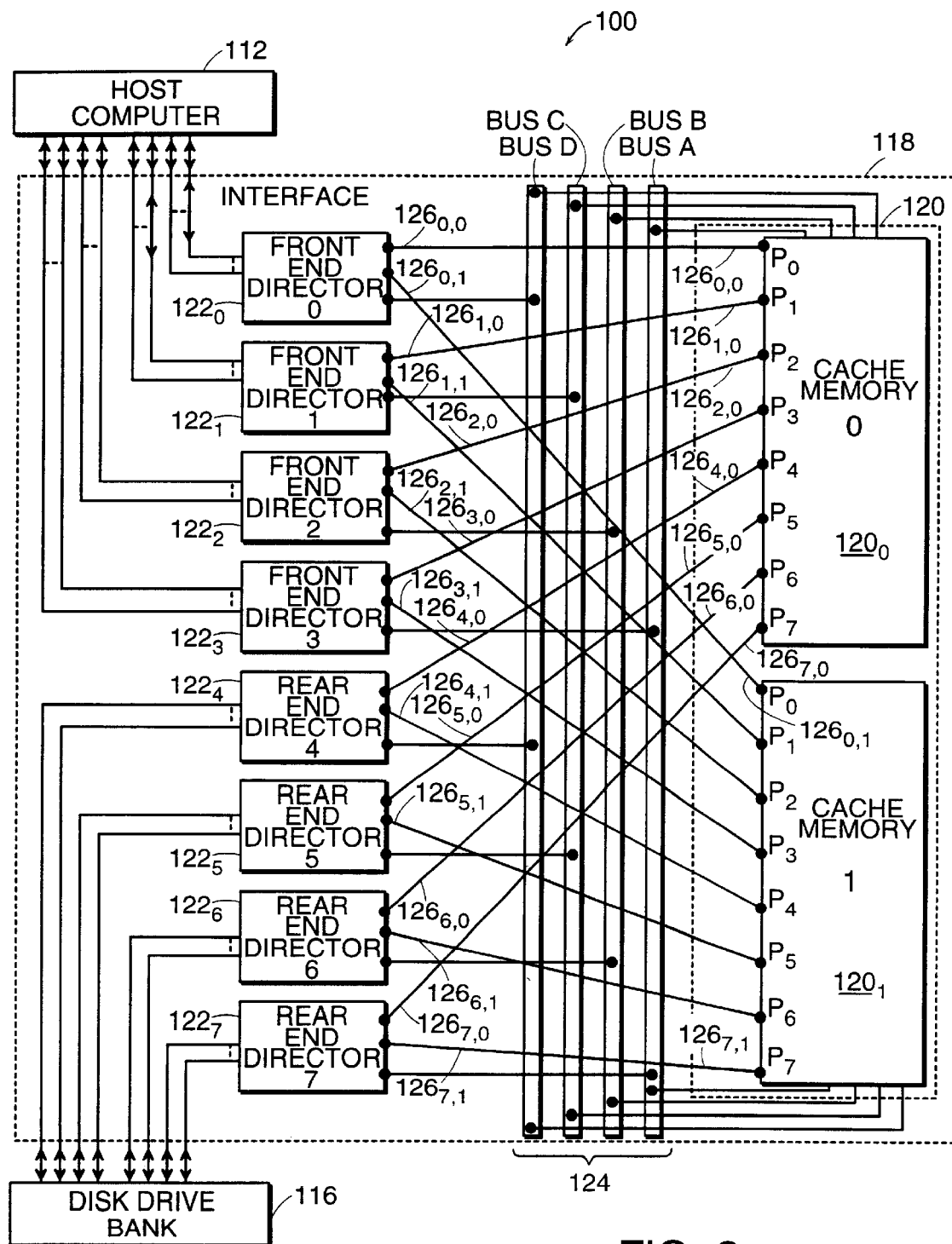
FIG. 2 is a block diagram of a memory system according to the invention.
Figure 3:
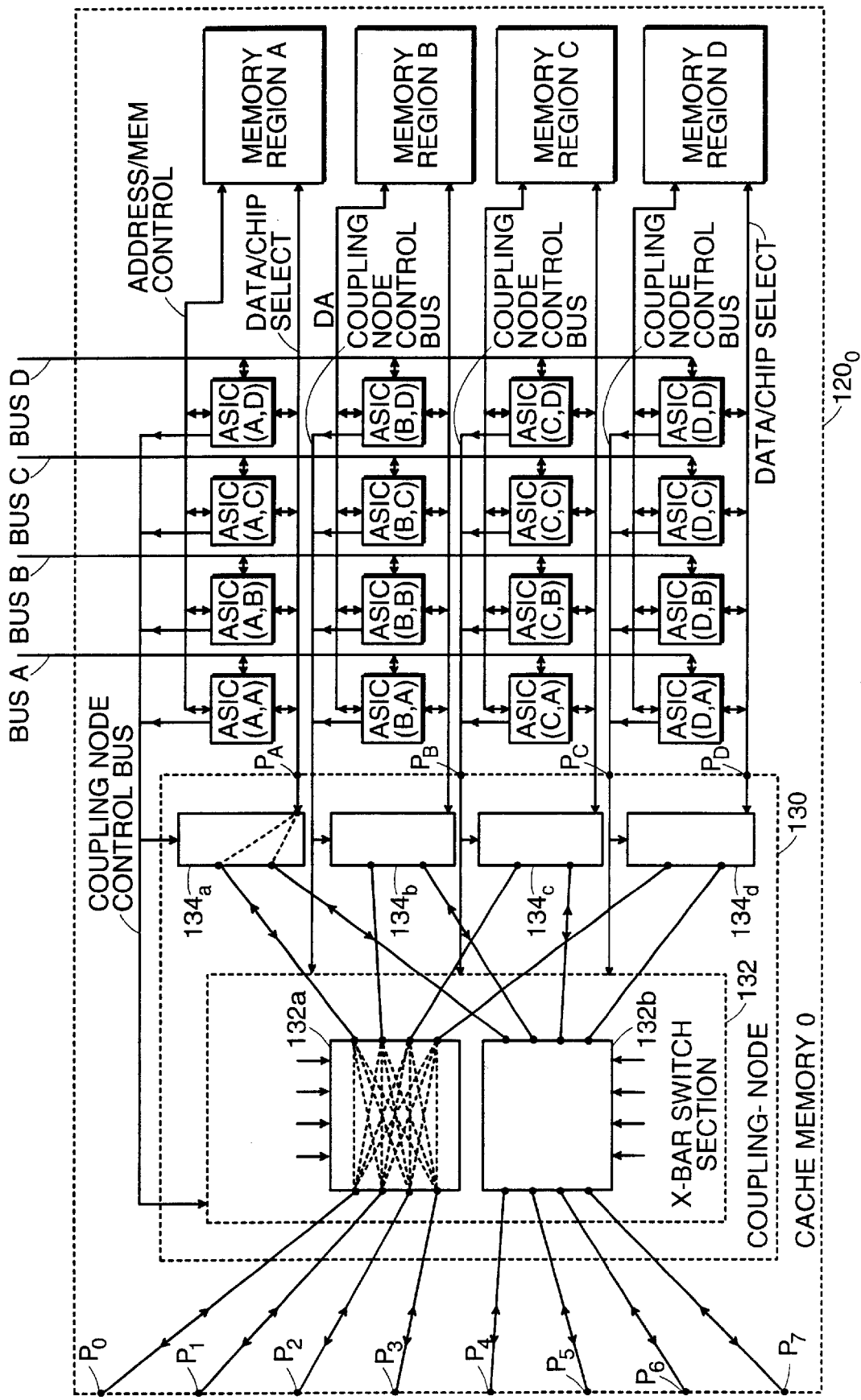
FIG. 3 is a block diagram of an exemplary one of a plurality of cache memory printed circuit boards used in the system of FIG. 2.

Referring now to FIG. 2, a computer system 100 is shown. The computer system 100 includes a host computer section 112 (e.g., a main frame or open systems computer section) having a plurality of processors, not shown, for processing end-user data. Portions of the processed end-user data are stored in, and retrieved data from, a bank 116 of disk drives through an interface 118. The interface includes a cache memory section 120, here made up of two identical cache memory printed circuit boards 120$_0$, 120$_1$, an exemplary one thereof, here memory board 120$_0$ being shown in, and to be discussed in detail in connection with, FIG. 3. Suffice it to say here, however, that the memory board 120$_0$ includes an array of DRAMs, here arranged in four memory regions, i.e., memory region A, memory region B. memory region C and memory region D, as shown in FIG. 3 and described in detail in co-pending patent application Ser. No. 09/052,268 now U.S. Pat. No. 5,943,287, entitled "Memory System" filed Mar. 31, 1998, inventor John K. Walton, the entire subject matter thereof being incorporated herein by reference.

Figure 4:
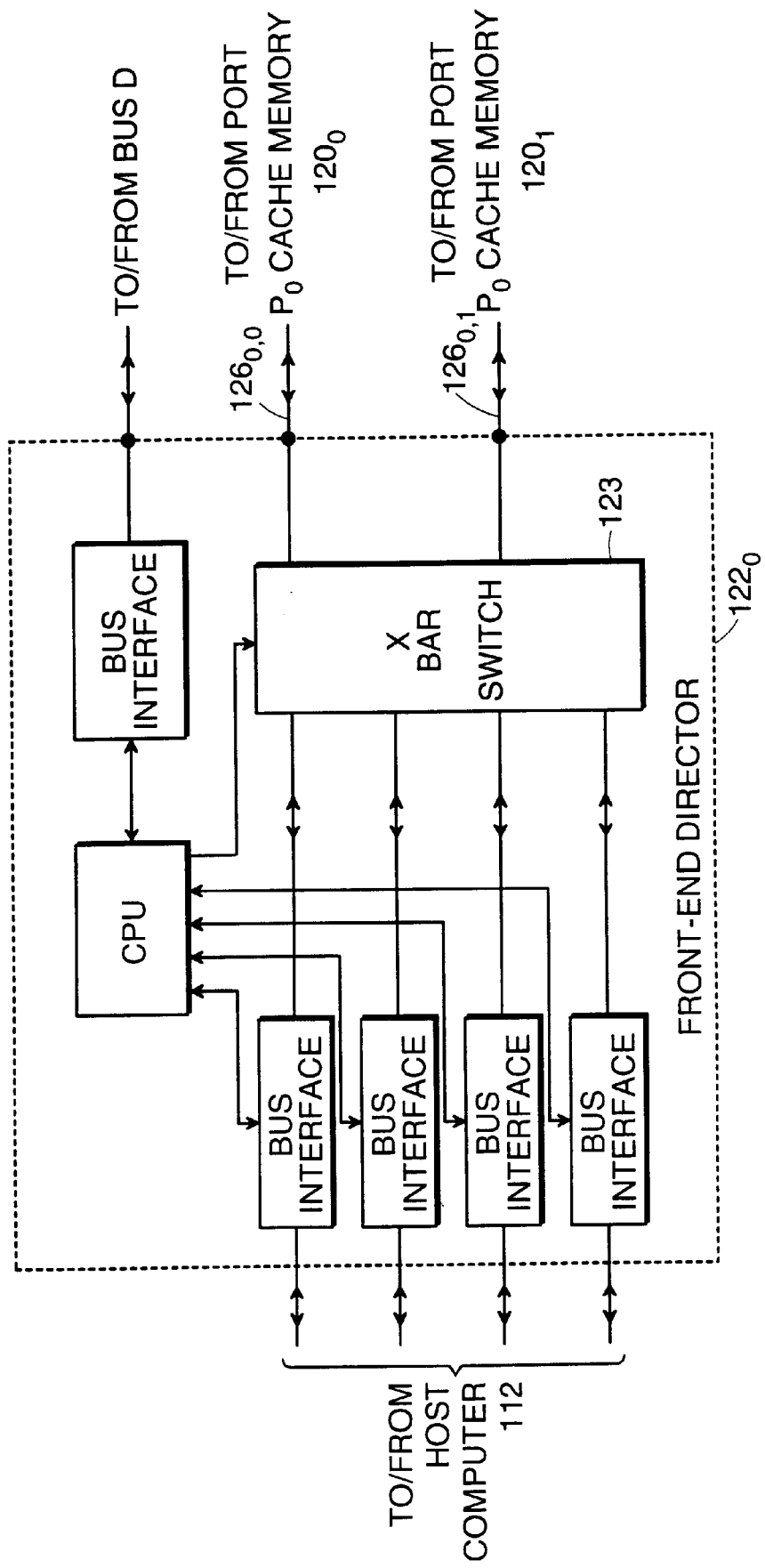
FIG. 4 is a block diagram of an exemplary one of a plurality of front-end directors used in the system of FIG. 2.
Figure 5:
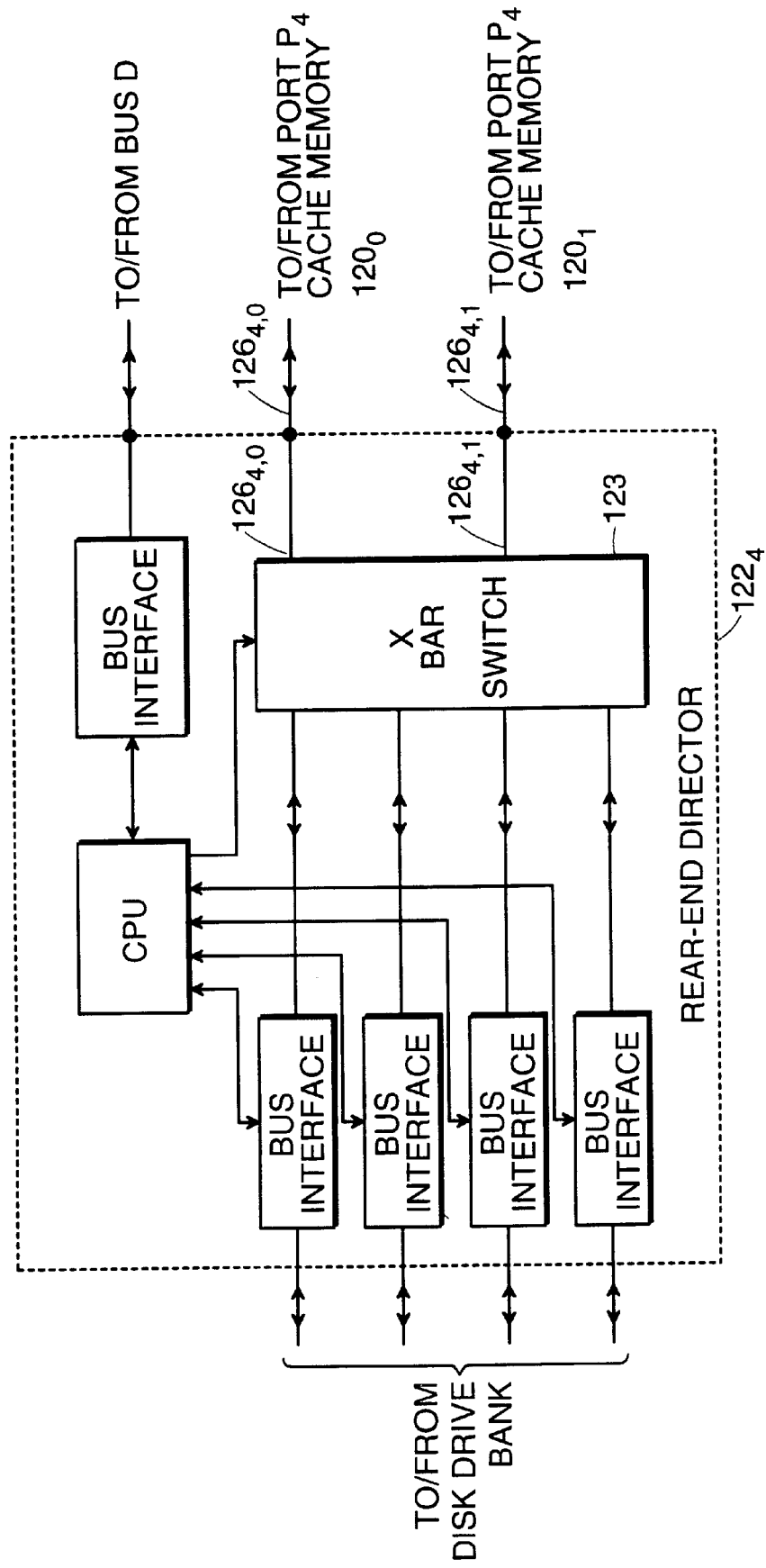
FIG. 5 is a block diagram of an exemplary one of a plurality of rear-end directors used in the system of FIG. 2.

Referring again to FIG. 2, the interface 118 also includes a plurality of, here eight directors 122$_0$–122$_7$. Here, four of the directors, i.e., directors 122$_0$–122$_3$, are front-end one of the directors and are coupled to the host computer 112. Here, four of the directors, i.e., directors 122$_4$–122$_7$, are rear-end one of the directors and are coupled to the bank of disk drives 116. Each one of the front-end directors 122$_0$–123 is identical in construction, an exemplary one thereof, here front-end director 122$_0$ being shown in FIG. 4. It is noted that here a cross-bar switch 123 is included to couple each one of a plurality, here four example four, processors, not shown in the host computer 112, to either port P$_0$ of cache memory 120$_0$ via serial bus 126$_{0,0}$, or port P$_0$ of cache memory 120$_1$ via serial bus 126$_{0,1}$ as indicated. Here, each one of the serial busses is a four wire bus having a differential pair of receive wires and a differential pair of transmit wires. Likewise, each one of the rear-end directors 122$_4$–122$_7$ is identical in construction, an exemplary one thereof, here rear-end director 122$_4$ being shown in FIG. 5. It is noted that here a cross-bar switch 123 equivalent to that shown in FIG. 4, is included to couple each one of a plurality, here four example four, rows disk drives, not shown, in bank 116, to either port P$_4$ of cache memory 120$_0$ via serial bus 126$_{4,0}$ or port P$_4$ of cache memory 120$_1$ via serial bus 126$_{4,1}$, as indicated.

Referring again to FIG. 2, the interface 118 also includes an interface state data bus section 124, here made up of four interface state data parallel, here 72 wire, busses, i.e., bus A, bus B, bus C, and bus D, for carrying interface state data through the interface 118. The interface state data bus section 124 is coupled to: the front-end directors 122$_0$–122$_3$, the rear-end directors 122$_4$–122$_7$; and all to the cache memory printed circuit boards 120$_0$, 120$_1$. Thus, each one of the four busses is a multi-drop bus. The interface 118 also includes a plurality of, here 16, serial end-user data busses 126$_{0,0}$–126$_{7,1}$ for carrying end-user data, as indicated. Each one of the plurality of end-user data busses 126$_{0,0}$–126$_{7,1}$ has a first end coupled to a corresponding one of the plurality of directors 122$_0$–122$_7$ and a second end coupled to the memory section 120. More particularly, and considering director 122$_0$, such director is coupled to memory bard 122$_0$ through end-user data bus 126$_{0,0}$ and to memory board 122$_0$ through end-user data bus 126$_{0,1}$. Director 122$_1$ is coupled to memory bard 122$_0$ through end-user data bus 126$_{1,0}$, and to memory board 122$_1$ through end-user data bus 126$_{1,1}$. The other directors are coupled in like manner, for example, director 122$_7$ is coupled to memory board 122$_0$ through end-user data bus 126$_{7,0}$ and to memory board 122$_1$ through end-user data bus 126$_{7,1}$, as shown. The plurality of directors 122$_0$–122$_7$ control the end-user data transfer between the host computer 112 and the bank of disk drives 116 through the memory 120 via the end-user data busses 126$_{0,0}$–126$_{7,1}$ in response to interface state data generated by the directors 122$_0$–122$_7$. The interface state data is generated by the directors 122$_0$–122$_7$ and is transferred among the directors 122$_0$–122$_7$ through the memory section 120 via the interface state bus section 124.

An exemplary one of the cache memories 120$_0$, 120$_1$, here memory 120$_0$ is shown in detail in FIG. 3. Such memory section 120$_0$ includes a plurality of, here four random access memory (RAM) regions (i.e. RAM region A, RAM region B, RAM region C and RAM region D, as shown, and a matrix of rows and columns of control logic sections, here Application Specific Integrated circuits (ASICs), i.e, control logic section ASIC A,A . . . control logic section ASIC D,D. Each one of the four columns of control logic section ASICs is coupled to a corresponding one of the interface state data busses A, B, C, and D, respectively, as shown. More particularly, a first column of control logic sections (i.e., ASICs A,A; B,A; C,A and D,A) are coupled to the A bus. A second column of control logic sections (i.e., ASICs A,B; B,B; C,B and D,B) are coupled to the B bus. A third column of control logic sections (i.e., ASICs A,C; B,C; C,C and D,C) are coupled to the C bus. A fourth column of control logic sections (i.e., ASICs A,D; B,D; C,D and D,D) are coupled to the D bus.

Each one of the rows of the control logic sections ASIC A,A . . . ASIC D,D is coupled to a corresponding one of the four RAM regions, RAM region A . . . RAM region D, via a DATA/CHIP SELECT, as indicated. The first row of ASICs A,A; A,B; A,C; and A,D is coupled to the DATA/CHIP SELECT BUS of RAM region A. The second row of ASICs B,A; B,B; B,C; and B,D is coupled to the DATA/CHIP SELECT BUS of RAM region B. The third row of ASICs C,A; C,B; C,C; and C,D is coupled to the DATA/CHIP SELECT BUS of RAM region C. The fourth row of ASICS D,A; D,B; D,C; and D,D is coupled to the DATA/CHIP SELECT BUS of RAM region D. It should be noted that the control logic sections ASIC A,A . . . ASIC D,D in each of the four rows thereof are interconnected through an arbitration bus, not shown, in a manner described in detail in co-pending patent application entitled "Bus Arbitration System", Ser. No. 08/996,807, filed Dec. 23, 1997, inventors Christopher S. MacLellan and John K. Walton, assigned to the same assignee as the present invention, the entire subject matter thereof being incorporated in this patent application.

Each one of the rows of the control logic sections ASIC A,A . . . ASIC D,D is coupled to a corresponding one of the four RAM regions, RAM region A . . . RAM region D, via an MEMORY ADDRESS/CONTROL BUS, as indicated. The first row of ASICs A,A; A,B; A,C; and A,D is coupled to the MEMORY ADDRESS/CONTROL BUS of RAM region A. The second row of ASICs B,A; B,B; B,C; and B,D is coupled to the MEMORY ADDRESS/MEMORY BUS of RAM region B. The third row of ASICs C,A; C,B; C,C; and C,D is coupled to the MEMORY ADDRESS/CONTROL BUS of RAM region C. The fourth row of ASICs D,A; D,B; D,C; and D,D is coupled to the MEMORY ADDRESS/CONTROL BUS of RAM region D.

The cache memory $120_0$ also includes a coupling node 130 adapted to couple any one of the ports $P_0$–$P_7$ to any one of four ports $P_A$, $P_B$, $P_C$, and $P_D$. Thus, the coupling node 130 adapted to couple any one of the ports $P_0$–$P_7$ to any one of the rows of DATA/CHIP SELECT BUSSES, i.e., any one of the ports $P_0$–$P_7$ to any one of the four memory regions, A, B, C or D, selectively in response to control signals produced by the ASICs A,A through D,D on a COUPLING NODE CONTROL BUS of each one of the ASICs A,A through D,D. It should be noted that the end-user data is selectively coupled through the coupling node 130 in accordance with routing information fed thereto by the ASICs A,A through D,D in a manner to be described.

The coupling node 130 includes a cross-bar switch section 132 having a plurality of, here two, cross-bar switches 132a, 132b. The coupling node 130 also includes a plurality of, here four, data selectors 134a through 134d. Each one of the cross-bar switches 132a, 132b is a 4×4 cross-bar switch controlled by control signals fed thereto by the ASICs A,A through D,D. Thus, each one of the crossbar switches 132a, 132b as four input/outputs (here coupled to ports $P_0$–$P_3$, $P_4$–$P_7$, respectively, as indicated and four output/inputs coupled to a corresponding one of a pair of input/outputs of the four data selectors 134a through 134d.

Figure 6:
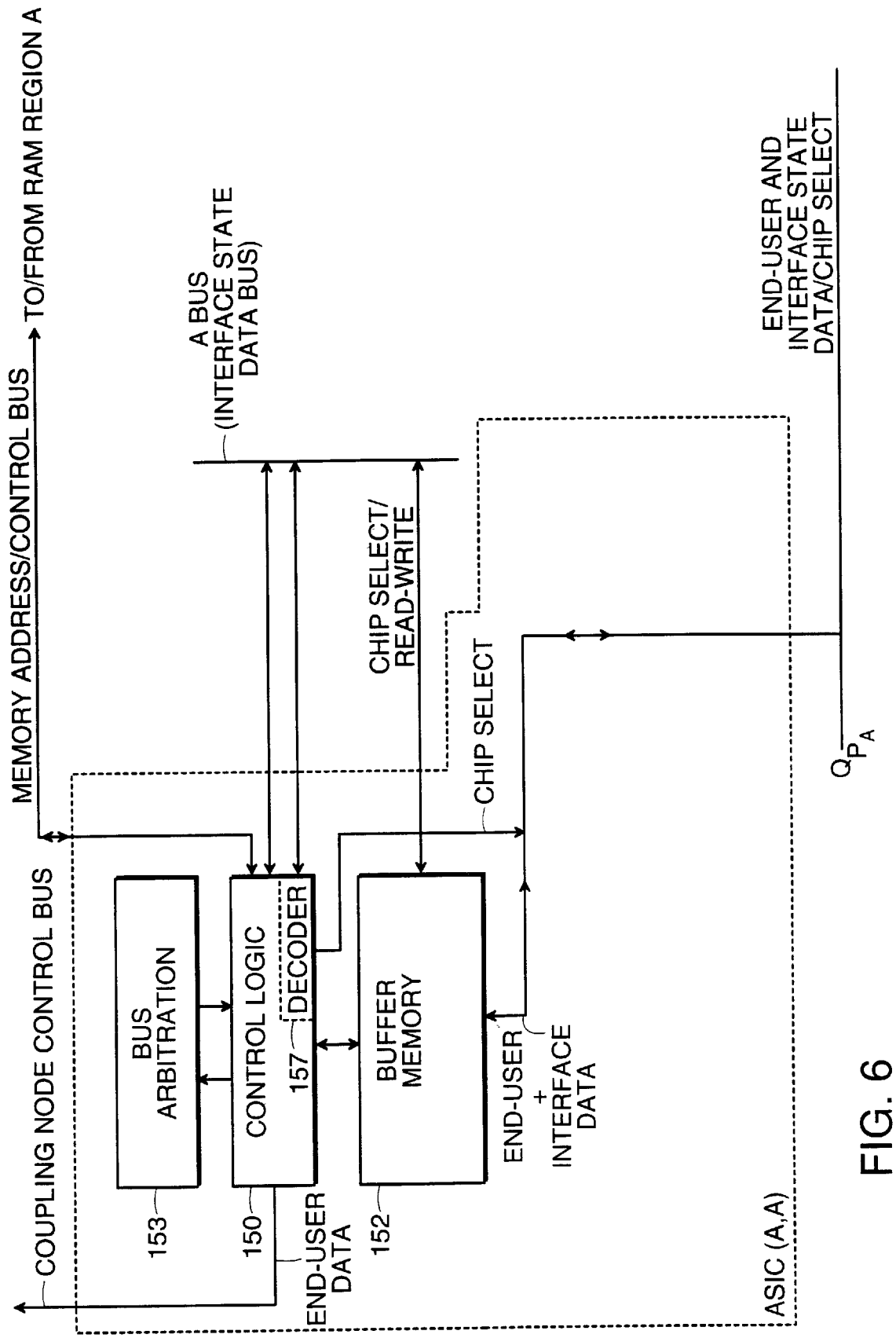
FIG. 6 is a block diagram of an exemplary one of a plurality of ASIC control logics used in the cache memories of FIG. 3.

Each one of such control logic sections ASICs A,A–D,D is identical in construction, an exemplary one thereof, here control logic section ASIC A,A being shown in detail in FIG. 6 to include a control logic 150 having control logic and a buffer memory 152 described in the above-referenced co-pending patent application entitled "TIMING PROTOCOL FOR A DATA STORAGE SYSTEM", inventor John K. Walton, Ser. No. 08/996,809, filed Dec. 23, 1997, assigned to the same assignee as the present invention, the entire subject matter thereof being incorporated herein by reference. The ASIC (A,A) controls transfer of data between the buffer memory 152 and the one of the plurality of buses (i.e., A bus, B bus B, C bus and D bus) coupled to the control logic section ASIC A,A, here bus A. The control logic section ASIC A,A is adapted to produce a control/data bus request for the one of the control/data buses coupled thereto (here RAM region A) and is adapted to effect the transfer in response to a control/data bus grant fed to the control logic section (here ASIC A,A) in accordance with a protocol described in the above-referenced co-pending application entitled "TIMING PROTOCOL FOR A DATA STORAGE SYSTEM", Ser. No. 08/996,809, inventor John K. Walton, filed Dec. 23, 1997, the entire subject matter thereof being incorporated herein by reference. The control logic section ASIC A,A also includes a bus arbitration section 153 described in detail in connection with the above referenced patent application entitled "Bus Arbitration System", filed Dec. 23, 1997, inventors Christopher S. MacLellan and John K. Walton. Here, however, the arbitration section also arbitrates for memory contention with one addition bus, the one end-user data serial busses coupled to either port $P_A$, $P_B$, $P_C$, or $P_D$ by the cross-bar switch section 132, in addition to busses A, B., C, and, D. The control logic 150 includes a decoder 157 for decoding the eight chip select signals and one read/write signals on the A bus as described in detail in the above referenced co-pending patent application Ser. No. 09/052,268. The decoder 157 produces address, control, and clock for the memory region A on the MEMORY ADDRESS/CONTROL BUS, as indicated.

The routing information is fed to the ASICs A,A through D,D via the interface state data busses A, B, C, and D. Thus, for example, if a burst end-user data is to be transferred from director $122_3$ to memory region A of cache memory $120_0$, it is first noted that such director $122_3$ is connected to interface state data bus A and therefore the coupling node routing information is for such end-user data transfer is placed by director $122_3$ on interface state data bus A. Referring now also to FIGS. 3 and 6, the ASIC A,A control logic, in response to the coupling node routing information on bus A, presents control information on the COUPLING NODE CONTROL BUS coupled thereto to couple port $P_3$ of the cache memory $120_0$ (which is connected to director $122_3$ via end-user bus $126_{3,0}$) through cross-bar switch 132a and selector 134a to port $P_A$.

Figure 7:
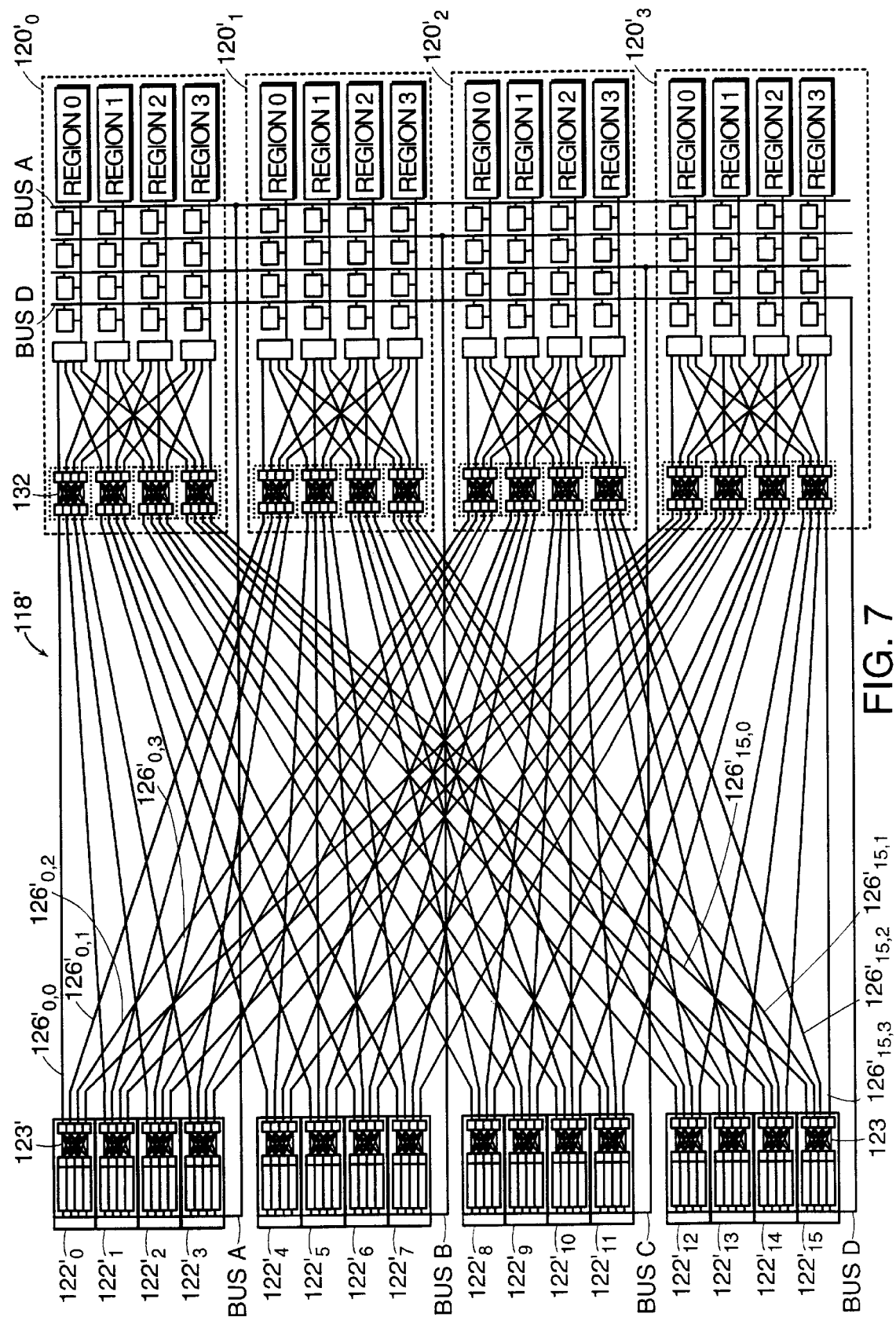
FIG. 7 is a block diagram of another embodiment of an interface in accordance with the invention.

Referring now to FIG. 7, another embodiment of an interface, here interface 118' is shown. Here, the interface 118' includes 16 directors $122'_0$–$122'_{15}$ and four cache memory printed circuit boards $120'_0$–$120'_3$ interconnected through parallel, multi-drop busses A, B, C and D for carrying interface state data and sixty-four sets of serial, point-to-point busses $126'_{0,0}$–$126'_{0,3}$ through $126'_{15,0}$–$126'_{15,3}$ for carrying end-user data, as shown. It is noted that here there are four cross-bar switches 132 for each printed circuit board $120'_0$–$120'_3$. Further, here each one of the directors $122'_0$–$122'_{15}$ includes four cross-bar switches 132', each one being a 4×4 cross-bar switch.

Figure 8:
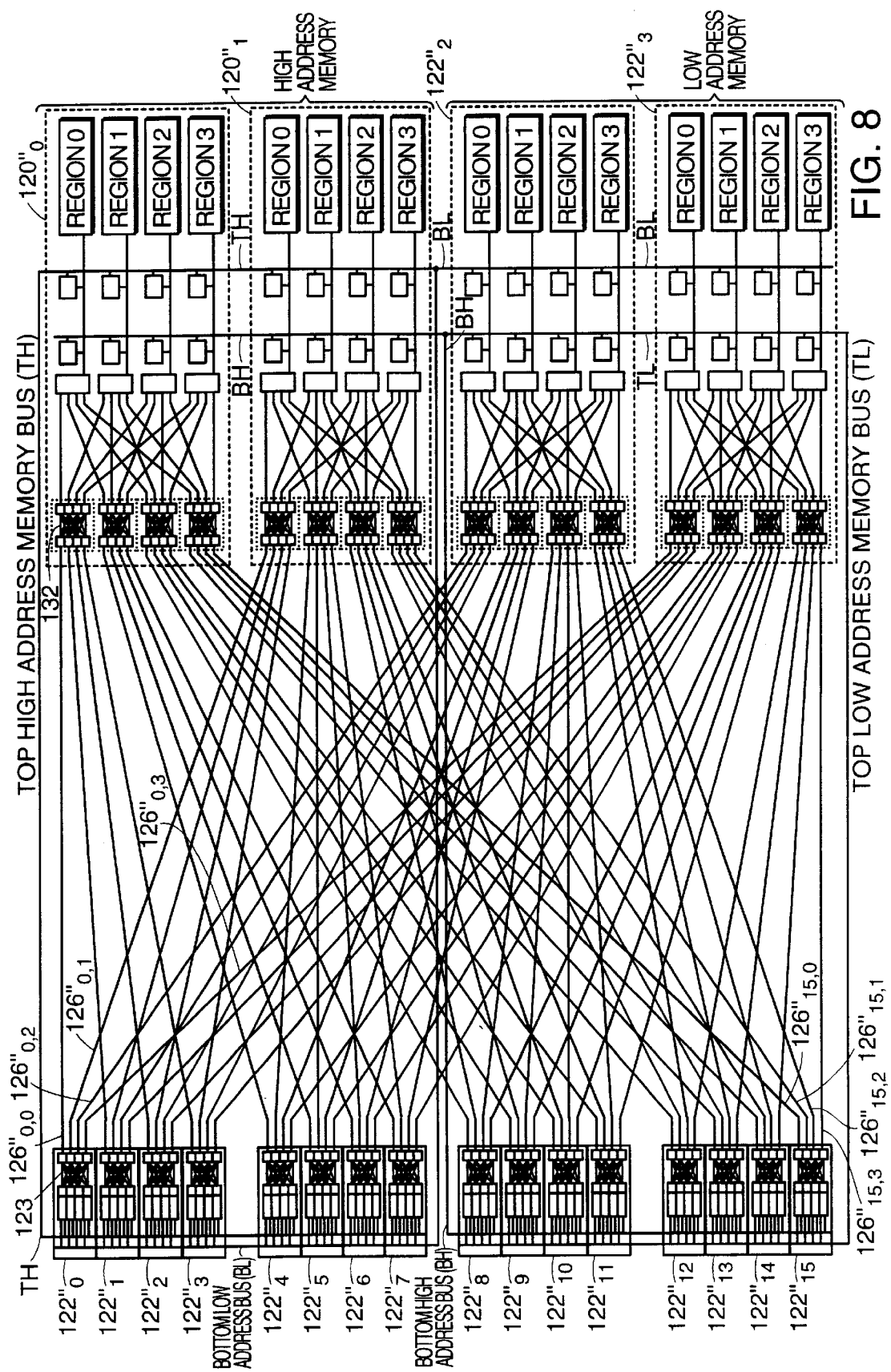
FIG. 8 is a block diagram of still another embodiment of an interface in accordance with the invention.

Referring now to FIG. 8 another embodiment of an interface, here interface 118" is shown. Such interface 118" includes 16 directors $122''_0$–$122''_{15}$ and four cache memory printed circuit boards $120''_0$–$120''_3$ interconnected through four parallel, multi-drop busses TH, TL, BH, and BL, such busses being arranged as shown and as described in co-pending patent application entitled "Data Storage System", inventors Daniel Castel, et al., assigned to the same assignee as the present invention, and filed on the same day as this patent application, the entire subject matter thereof being incorporated herein by reference. As described in such co-patent application, the cache memory is arranged to two set; one set having low address and one set having high addresses. Thus, here cache memory printed circuit boards $120''_0$ and $120''_1$ are included in the high address memory set and cache memory printed circuit boards $120''_2$ and $120''_3$ are included in the low address memory set. Here, however, the parallel, multi-drop busses TH (i.e., top high), TL (i.e., top low), BH (bottom high), and BL (bottom low B) are used to carry interface state words and end-user data is carried by serial, point-to-point busses $126''_{0,0}$ through $126''_{15,3}$, as indicated in FIG. 8.

Other embodiments are within the spirit and scope of the appended claims.

What is claimed is:

1. A data storage system wherein end-user data is transferred between a host computer and a bank of disk drives through an interface, such interface, comprising:
   a memory;
   a plurality of directors, at least one front-end one of the directors being in communication with the host computer and at least one rear-end one of the directors being in communication with the bank of disk drives;
   an interface state data bus section, for carrying interface state data, such interface state data bus section being in communication with: both the at least one front-end one and the at least one rear-end one of the directors; and the memory;
   a plurality of end-user data busses, for carrying end-user data, each one of the plurality of end-user data busses having a first end coupled to a corresponding one of the plurality of directors and a second end coupled to the memory; and
   wherein such plurality of directors control the end-user data transfer between the host computer and the bank of disk drives through the memory via the end-user data busses in response to interface state data generated by the directors, such generated interface state data being transferred among the directors through the memory via the interface state data bus section.

2. The system recited in claim 1 wherein the end-users data busses are serial busses.

3. The system recited in claim 1 wherein the interface state data bus section includes parallel busses.

4. The system recited in claim 3 wherein the parallel busses are coupled to the directors in a multi-drop configuration.

5. The system recited in claim 3 wherein the end-user data busses are serial busses.

6. The system recited in claim 5 wherein the parallel busses are coupled to the directors in a multi-drop configuration.

7. The system recited in claim 1 including a coupling node and wherein each the memory has a plurality of regions and wherein the each one of the end-user data buses is coupled to the plurality of regions selectively through a coupling node.

8. The system recited in claim 7 wherein the coupling node includes a cross-bar switch.

9. The system recited in claim 3 wherein the interface state data bus section includes a plurality of parallel busses, each one thereof being coupled to a one of the plurality of directors and to the memory.

10. A method of operating a data storage system wherein end-user data is transferred between a host computer and a bank of disk drives through an interface, such method comprising:
    providing a memory;
    providing a plurality of directors, at least one front-end one of the directors being in communication with the host computer and at least one rear-end one of the directors being in communication with the bank of disk drives;
    providing a plurality of interface state data busses for carrying interface state data, such interface state data busses being in communication with: both the at least one front-end one and the at least one rear-end one of the directors; and the memory;
    providing a plurality of end-user data busses, for carrying end-user data, each one of the plurality of end-user data busses having a first end coupled to a corresponding one of the plurality of directors and a second end coupled to the memory; and
    wherein such plurality of directors control the end-user data transfer between the host computer and the bank of disk drives through the memory via the end-user data busses in response to interface state data generated by the directors, such generated interface state data being transferred among the directors through the memory via the interface state data bus.

11. A data storage system wherein end-user data is transferred between a host computer and a bank of disk drives through an interface, such interface, comprising:
    a memory;
    a plurality of directors, at least one front-end one of the directors being in communication with the host computer and at least one rear-end one of the directors being in communication with the bank of disk drives;
    an interface state data bus section, for carrying interface state data, such interface state data bus section being in communication with the at least one front-end one and the at least one rear-end one of the directors;
    a plurality of end-user data busses, for carrying end-user data, each one of the plurality of end-user data busses having a first end coupled to a corresponding one of the plurality of directors and a second end coupled to the memory; and
    wherein such plurality of directors control the end-user data transfer between the host computer and the bank of disk drives through the memory via the end-user data busses in response to interface state data generated by the directors, such generated interface state data being transferred among the directors via the interface state data bus section.

12. The system recited in claim 11 wherein the end-users data busses are serial busses.

13. The system recited in claim 11 wherein the interface state data bus section includes parallel busses.

14. The system recited in claim 13 wherein the parallel busses are coupled to the directors in a multi-drop configuration.

15. The system recited in claim 13 wherein the end-user data busses are serial busses.

16. The system recited in claim 15 wherein the parallel busses are coupled to the directors in a multi-drop configuration.

17. The system recited in claim 11 including a coupling node and wherein each the memory has a plurality of regions and wherein the each one of the end-user data buses is coupled to the plurality of regions selectively through a coupling node.

18. The system recited in claim 13 wherein the interface state data bus section includes a plurality of parallel busses, each one thereof being coupled to a one of the plurality of directors and to the memory.

19. A method of operating a data storage system wherein end-user data is transferred between a host computer and a bank of disk drives through an interface, such method comprising:

providing a memory;
  providing a plurality of directors, at least one front-end one of the directors being in communication with the host computer and at least one rear-end one of the directors being in communication with the bank of disk drives;
  providing an interface state data section for carrying interface state data, such interface state data section being in communication with the at least one front-end one and the at least one rear-end one of the directors;
  providing a plurality of end-user data busses, for carrying end-user data, each one of the plurality of end-user data busses having a first end coupled to a corresponding one of the plurality of directors and a second end coupled to the memory; and
  wherein such plurality of directors control the end-user data transfer between the host computer and the bank of disk drives and the memory via the end-user data busses in response to interface state data generated by the directors, such generated interface state data being transferred among the directors via the interface state data section.

20. A data storage system wherein end-user data is transferred between a host computer and a bank of disk drives through an interface, such interface, comprising:
  a memory;
  a plurality of directors, a front-end portion of such plurality of directors being in communication with the host computer, and a rear end portion of such plurality of directors being in communication with the bank of disk drives;
  an interface state data bus section, for carrying interface state data, such interface state data bus section being in communication with both the front-end portion of the plurality of directors and the rear end portion of the plurality of directors;
  a plurality of end-user data busses, for carrying end-user data, each one of the plurality of end-user data busses having a first end coupled to a corresponding one of the plurality of directors and a second end coupled to the memory; and
  wherein such plurality of directors control the end-user data transfer between the host computer and the bank of disk drives through the memory via the end-user data busses in response to interface state data generated by the directors, such generated interface state data being transferred among the directors via the interface state data bus section.

21. The system recited in claim 20 wherein the end-users data busses are serial busses.

22. The system recited in claim 20 wherein the interface state data bus section includes parallel busses.

23. The system recited in claim 22 wherein the parallel busses are coupled to the directors in a multi-drop configuration.

24. The system recited in claim 22 wherein the end-user data busses are serial busses.

25. The system recited in claim 24 wherein the parallel busses are coupled to the directors in a multi-drop configuration.

26. The system recited in claim 20 including a coupling node and wherein each the memory has a plurality of regions and wherein the each one of the end-user data buses is coupled to the plurality of regions selectively through a coupling node.

27. The system recited in claim 26 wherein the coupling node includes a cross-bar switch.

28. The system recited in claim 22 wherein the interface state data bus section includes a plurality of parallel busses, each one thereof being coupled to a one of the plurality of directors and to the memory.

29. A method of operating a data storage system wherein end-user data is transferred between a host computer and a bank of disk drives through an interface, such method comprising:
  providing a memory;
  providing a plurality of directors, a front end portion of the directors being in communication with the host computer and a rear end portion of the directors being in communication with the bank of disk drives;
  providing an interface state data section for carrying interface state data, such interface state data section being in communication with the front end portion of the directors and the rear end portion of the directors;
  providing a plurality of end-user data busses, for carrying end-user data, each one of the plurality of end-user data busses having a first end coupled to a corresponding one of the plurality of directors and a second end coupled to the memory; and
  wherein such plurality of directors control the end-user data transfer between the host computer and the bank of disk drives and the memory via the end-user data busses in response to interface state data generated by the directors, such generated interface state data being transferred among the directors via the interface state data section.

30. A data storage system wherein end-user data is transferred between a host computer and a bank of disk drives through an interface, such interface, comprising:
  a memory;
  a plurality of directors, comprising:
    a plurality of front-end directors, such plurality of front end directors being in communication with the host computer, and
    a plurality of rear end directors, such plurality of rear end directors being in communication with the bank of disk drives;
  an interface state data bus section, for carrying interface state data, such interface state data bus section being in communication with both the front-end portion of the plurality of directors and the rear end portion of the plurality of directors;
  a plurality of end-user data busses, for carrying end-user data, each one of a first portion of the plurality of end-user data busses having a first end coupled to a corresponding one of the plurality of front end directors and a second end coupled to the memory and each one of a second portion of the plurality of end user data buses having a first end coupled to a corresponding one of the plurality of rear end directors and a second end coupled to the memory; and
  wherein such plurality of directors control the end-user data transfer between the host computer and the bank of disk drives through the memory via the end-user data busses in response to interface state data generated by the directors, such generated interface state data being transferred among the directors via the interface state data bus section.

31. The system recited in claim 30 wherein the first portion of the end-users data busses comprises a plurality of serial busses.

32. The system recited in claim 30 wherein the second portion of the interface state data bus section comprises a plurality of serial busses.

33. The system recited in claim 32 wherein the first portion of the end-users data busses comprises a plurality of serial busses.

34. A method of operating a data storage system wherein end-user data is transferred between a host computer and a bank of disk drives through an interface, such method comprising:

providing a memory;

providing a plurality of directors, such plurality of directors comprising:

a plurality of front end directors, such plurality of front end directors being in communication with the host computer, and;

a plurality of rear end directors, such plurality of rear end directors being in communication with the bank of disk drives;

providing an interface state data section for carrying interface state data, such interface state data section being in communication with the plurality of front end directors and the plurality of rear end directors;

providing a plurality of end-user data busses, for carrying end-user data, each one of a first portion of the plurality of end-user data busses having a first end coupled to a corresponding one of the plurality of front end directors and a second end coupled to the memory and each one of a second portion of the plurality of end user buses having a first end coupled to a corresponding one of the plurality of the rear end directors and a second end coupled to the memory;

wherein such plurality of directors control the end-user data transfer between the host computer and the bank of disk drives and the memory via the end-user data busses in response to interface state data generated by the directors, such generated interface state data being transferred among the directors via the interface state data section.

35. The method recited in claim 34 wherein the first portion of the end-users data busses is provided with a plurality of serial busses.

36. The method recited in claim 34 wherein the second portion of the interface state data bus section is provided with a plurality of serial busses.

37. The method recited in claim 36 wherein the first portion of the end-users data busses is provided with a plurality of serial busses.

* * * * *